(12) United States Patent
Asaka et al.

(10) Patent No.: US 7,151,334 B2
(45) Date of Patent: Dec. 19, 2006

(54) PERMANENT MAGNET TYPE ROTOR AND METHOD OF MANUFACTURING THE ROTOR

(75) Inventors: Kazuo Asaka, Matsudo (JP); Tomoaki Arakawa, Souka (JP); Tsuyoshi Kagaya, Kashiwa (JP); Satoru Shinzaki, Wako (JP); Hiromitsu Sato, Wako (JP); Kenji Fukuda, Wako (JP); Hirohisa Ogawa, Wako (JP); Tatsuro Horie, Wako (JP); Akihiro Okamura, Wako (JP); Katsuaki Sato, Wako (JP); Toshiyasu Komatsu, Wako (JP); Youichi Nakahara, Wako (JP)

(73) Assignees: Hitachi Powdered Metals Co., Ltd., Chiba (JP); Honda Giken Kogyo Kabushiki Kaisha, Tokyo (JP)

( * ) Notice: Subject to any disclaimer, the term of this patent is extended or adjusted under 35 U.S.C. 154(b) by 294 days.

(21) Appl. No.: 10/432,607

(22) PCT Filed: Sep. 3, 2002

(86) PCT No.: PCT/JP02/08937

§ 371 (c)(1),
(2), (4) Date: Jun. 3, 2003

(87) PCT Pub. No.: WO03/021742

PCT Pub. Date: Mar. 13, 2003

(65) Prior Publication Data

US 2004/0025323 A1    Feb. 12, 2004

(30) Foreign Application Priority Data

Sep. 3, 2001   (JP) .............................. 2001-266327
Dec. 12, 2001  (JP) .............................. 2001-378260

(51) Int. Cl.
*H02K 21/12*    (2006.01)

(52) U.S. Cl. ............... 310/156.12; 310/44; 310/156.26
(58) Field of Classification Search ........... 310/156.08, 310/156.12–156.15, 156.26, 156.28, 156.29, 310/156.31, 44; 29/596, 598, 602.1
See application file for complete search history.

(56) References Cited

U.S. PATENT DOCUMENTS

| 4,641,422 | A | * | 2/1987 | Weaver ........................ 29/598 |
| 4,841,186 | A | * | 6/1989 | Feigel et al. ........... 310/156.12 |
| 5,001,607 | A | * | 3/1991 | Breithaupt ................... 361/516 |
| 5,040,286 | A | * | 8/1991 | Stark ............................ 29/598 |
| 5,190,102 | A | * | 3/1993 | Arterbury et al. .......... 166/228 |
| 5,402,024 | A | * | 3/1995 | Watanabe et al. ...... 310/156.12 |
| 5,500,994 | A | * | 3/1996 | Itaya ........................... 29/598 |

(Continued)

FOREIGN PATENT DOCUMENTS

DE    28 24 257 A 1    12/1979

(Continued)

*Primary Examiner*—Tran Nguyen
(74) *Attorney, Agent, or Firm*—Arent Fox PLLC (57) ABSTRACT

A permanent magnet type rotor comprises an inner member 2 having an outer ring portion 21; an approximately annular outer member 1 having soft magnetism and an inner circumference contacting with an outer circumference of the outer ring portion; and plural permanent magnets 3 disposed at equal intervals on the outer circumference of the outer member toward the circumferential direction. At least one of the inner member 2 and the outer member 1 is made from a sintered material, and the inner member 2 and the outer member 1 are mutually sintered and bonded. Thickness and weight of a dynamotor itself can be reduced and high output and high efficiency can be achieved.

10 Claims, 8 Drawing Sheets

U.S. PATENT DOCUMENTS

| | | | |
|---|---|---|---|
| 5,722,032 A | 2/1998 | Gay | |
| 5,881,447 A * | 3/1999 | Molnar | 29/598 |
| 6,057,621 A * | 5/2000 | Suzuki et al. | 310/156.12 |
| 6,144,130 A * | 11/2000 | Kawamura | 310/156.28 |
| 6,489,696 B1 * | 12/2002 | Sashino et al. | 310/43 |
| 2003/0019106 A1 * | 1/2003 | Pope et al. | 29/898 |
| 2003/0110617 A1 * | 6/2003 | Reppel et al. | 29/607 |

FOREIGN PATENT DOCUMENTS

| | | | | |
|---|---|---|---|---|
| EP | 0 854 558 A2 | 7/1998 | | |
| EP | 1 424 761 A1 | 6/2004 | | |
| JP | 58-165653 | 9/1983 | | |
| JP | 59-95783 | 6/1984 | | |
| JP | 63056906 A * | 3/1988 | | 29/602.01 |
| JP | 05260710 A * | 10/1993 | | 310/211 |
| JP | 09-093842 | 4/1997 | | |
| JP | 09-191589 | 7/1997 | | |
| JP | 2001-169485 | 6/2001 | | |
| JP | 2001-178043 | 6/2001 | | |
| JP | 2001-346345 | 12/2001 | | |
| JP | 2002-34188 | 1/2002 | | |
| JP | 2002-159150 | 5/2002 | | |

* cited by examiner

PERMANENT MAGNET TYPE ROTOR AND METHOD OF MANUFACTURING THE ROTOR

FIELD OF THE INVENTION

The present invention relates to a permanent magnet type rotor having a permanent magnet disposed on a rotor surface, and relates to a manufacturing method therefor, and more particularly, the present invention relates to a technology for enhancing the magnetic characteristics and strength of the rotor.

DESCRIPTION OF THE RELATED ART

A permanent magnet type rotor used in a dynamotor mounted in an electric vehicle or a hybrid vehicle is required to have magnetic characteristics of high performance and high productivity. As materials for such a permanent magnet type motor, hitherto, silicon steel plate has been used. Since the rotor is tightened and fixed to the engine shaft, it is required to have high strength and hardness in order to be tightened firmly. However, silicon steel plate is brittle and low in strength, and reinforcing measures are required to obtain a necessary strength, and hence, the rotor is increased in its weight and size. It is difficult to employ a hollow shape to reduce the rotor weight since the strength will be insufficient.

For reduction of weight, there is known an example of a hollow shape made by a casting technique such as the lost wax method by using a material equivalent to S45C of the Japanese Industrial Standards. However, the S45C material has a high carbon content, and the magnetic characteristics are insufficient and satisfactory function as a dynamo or a motor cannot be obtained. Therefore, there has been demanded to provide a permanent magnet type rotor in which thickness and weight of the dynamotor itself can be reduced and high output and high efficiency can be achieved.

DISCLOSURE OF THE INVENTION

The present invention provides a permanent magnet type rotor comprising: an inner member having an outer ring portion; an approximately annular outer member having soft magnetism and an inner circumference contacting with an outer circumference of the outer ring portion; and plural permanent magnets disposed at equal intervals on the outer circumference of the outer member toward the circumferential direction; wherein at least one of the inner member and the outer member is made from a sintered material, and the inner member and the outer member are mutually diffusion-bonded together.

In a permanent magnet type rotor having such a configuration, by forming only the outer member for disposing the permanent magnets of a magnetic material and forming the inner member of a material of high strength, a hollow shape can be realized without reducing magnetic characteristics, and a surface magnet type rotor having a reduced weight and high efficiency can be obtained. Moreover, since at least one of the inner member and outer member is made from a sintered material, and the inner member and outer member are mutually diffusion-bonded together, the bonding strength between both is high, and there is no problem if the rotor is mounted to the shaft of an engine which rotates at high speed.

In the invention, since the inner member is made from a material having high strength, the weight can be reduced by forming the inner member in a hollow shape. In this hollow shape, for example, the inner member comprises an inner ring portion having a shaft or a through hole for a shaft, and is formed by connecting the outer ring portion and the inner ring portion by ribs.

In the invention, since the inner member and the outer member are mutually diffusion-bonded together, at least one of the two members may be made from a sintered material. For example, the outer member may be made from an ingot steel, and the inner member may be made from a sintered material. Alternatively, the inner member may be made from an ingot steel, and the outer member may be made from a sintered material.

Both the inner member and the outer member may be made from sintered materials. In this case, in order to perform sintering and bonding, one of the outer member and the inner member may be a sintered material and the other one may be a green compact, alternatively, both may be green compacts, and both may be mutually fitted and sintered. The ribs are preferably composed of plural connecting ribs disposed at equal intervals in the circumferential direction, and the permanent magnets may be respectively disposed on the outer circumference of the outer member at the connecting ribs of the inner member.

In the invention, the composition of the inner member composed of a sintered material is preferably equivalent to class 3, class 4, or class 5 in SMF specified in JIS Z 2550. As the outer member, a suitable material is a pure ferrous sintered material containing C: 0.3% by mass or less, a balance of Fe, and inevitable impurities. The pure ferrous sintered material preferably further contains at least one of Si: 3.5% by mass or less, P: 0.7% by mass or less, B: 0.3% by mass or less, and Cu: 3.0% by mass or less. Aside from these sintered materials, an ingot steel having a magnetic characteristic of saturated magnetic flux density of 1.0 T or more may be also preferably used.

The present invention further provides a manufacturing method for a permanent magnet type rotor, the method comprising: fitting a green compact for an inner member formed by compressing a mixed powder mainly composed of a ferrous alloy powder or an Fe powder and having an outer ring portion into an approximately annular outer member having an inner circumference contacting with an outer circumference of the inner ring portion; sintering both to integrate the inner member and the outer member; and disposing and fixing permanent magnets on the outer circumference of the outer member.

The green compact for the inner member preferably has a shape in which plural connecting ribs disposed at equal intervals toward the circumferential direction connect the outer ring portion and an inner ring portion having a shaft or a through hole for a shaft, and the permanent magnets are respectively disposed on the outer circumference of the outer member at the connecting ribs.

The outer member may be made from an ingot steel having a magnetic characteristic of saturated magnetic flux density of 1.0 T or more. Alternatively, the outer member may be a green compact formed by compressing an outer member forming mixed powder composed of an Fe powder mixed with a forming lubricant. Thus, by using a rigid material (a material other than the green compact) as the outer member, the green compact for the inner member expands more than the outer member during sintering, and a tensile stress occurs in the outer member; therefore, the bonding of both will be more securer. However, the invention is not limited to such manufacturing method, and it is also one of the preferred embodiments to compose the outer member by using a pure ferrous green compact formed by compressing an outer member forming mixed powder composed of an Fe powder mixed with a forming lubricant.

As the outer member, instead of the pure ferrous green compact or pure ferrous sintered compacts, it is also possible to use a ferrous green compact produced by an outer member forming mixed powder which is a mixed powder which is mixed an Fe—P powder, or an Fe powder and an Fe—P powder, and a forming lubricant, with a P content of 0.7% by mass or less, or a ferrous sintered compact formed by sintering such a ferrous green compact. It is further possible to use a ferrous green compact produced by an outer member forming mixed powder which further contains at least one of Si powder, Fe—Si powder, Fe—B powder, iron alloy powder containing B, Cu powder, and Cu—B powder, with a Si content of 3.5% by mass or less, a B content of 0.3% by mass or less, and a Cu content of 3.0% by mass or less, or a ferrous sintered compact formed by sintering such ferrous green compact.

In a manufacturing method for the permanent magnet type rotor of the invention, the green compact for the inner member preferably has a composition in which the thermal expansion of the inner member is greater than that of the outer member in the high temperature range of 800° C. or more during sintering process. Moreover, the inner member is preferably fitted into the outer member along a contacting surface by passing fit with a gap of 5 ì m or less between the inner diameter of the outer member and the outer diameter of the inner member, or by tightening fit with a tightening interference of within 0.0025 times the diameter of the contacting surface. In addition, green compact for the inner member is preferably formed by using a forming lubricant containing zinc, and is sintered in a carburizing atmosphere.

Preferred embodiments and characteristics of the permanent magnet type rotor of the invention will be more specifically explained hereinafter. In the permanent magnet type rotor of the invention, since both strength and magnetic characteristics are obtained, the inner member requiring strength is made from a ferrous sintered material containing carbon, and the outer member requiring magnetic characteristics is made from a magnetic material. The material for the inner member may be equivalent to class 3, class 4, or class 5 in SMF specified in JIS Z 2550, so that a sufficient strength is obtained. The material for the outer member may be a pure ferrous sintered material or a sintered material containing at least one of Si: 3.5% by mass or less, P: 0.7% by mass or less, B: 0.35 by mass or less, and Cu: 3.0% by mass or less in addition to the pure ferrous composition, so that the magnetic characteristics thereof may be superior. The reasons for limiting these components are as follows.

Si: It is preferable to contain Si since it promotes phase sintering, so that Fe grain becomes coarse and increases the magnetic permeability, and also the specific resistance is increased and the iron loss of magnetic force is decreased. However, if Si is contained excessively, the compressive property is deteriorated, whereby the sintering density decreases and the magnetic permeability decreases, and hence, the upper limit of Si is preferably 3.5% by mass.

P: P promotes sintering and increases grain size, so that the magnetic characteristics are improved. P inhibits diffusion of carbon contained in the inner member into the outer member, thereby inhibiting decrease of the magnetic characteristics. It is therefore preferred to contain a proper content of P. However, when the content of P increases, the magnetic permeability decreases. Furthermore, when P is contained in excess, impurities precipitate at grain boundaries, so that the size precision is deteriorated. Hence, the upper limit of the content of P is preferred to be 0.7% by mass.

B: B promotes sintering as well as P and increases grain size, and inhibits diffusion of carbon contained in the inner member into the outer member, thereby demonstrating the same advantages as P and enhancing the magnetic characteristics. It is therefore preferred to contain a proper content of B. However, when the content of B increases, the magnetic permeability decreases. Furthermore, when B is excessively contained, impurities precipitate at grain boundaries, and the compressive property is deteriorated, whereby the sintering density decreases and the magnetic permeability decreases. Hence, the upper limit of the content of B is preferred to be 0.3% by mass.

Cu: When Cu is added by up to 1.5% by mass, an effect of improving the magnetic characteristics can be sufficiently obtained. However, when more than that amount of Cu is added, the magnetic characteristic is deteriorated due to expansion of Cu. When more Cu is added, the bonding condition is deteriorated due to expansion of Cu. Hence, the upper limit of the content of Cu is preferred to be 3% by mass.

The outer member diffuses into and bonds with the inner member containing C, and hence contains C diffused from the inner member. When the content of C is 0.3% by mass or less, there is no problem since decrease of the magnetic characteristics is slight.

As the outer member, it is also possible to use ingot steel having magnetic characteristics such as electromagnetic soft iron or silicon steel such as SS, SPC, S10C to S30C, SUM11 to SUM 32, SUY, and the like, specified in the JIS instead of the above-mentioned sintered material.

As mentioned above, the permanent magnet type rotor in which at least one of the inner member and the outer member is made from a sintered material has been explained. A permanent magnet type rotor in which both the inner member and the outer member are made from sintered material will be explained hereinafter.

The present invention further provides a permanent magnet type rotor comprising: an annular outer member composed of a sintered body; an inner member composed of a sintered body having a lower density than that of the outer member and an outer circumference contacting with an inner circumference of the outer member; and plural permanent magnets disposed at intervals on the outer circumference of the outer member toward the circumferential direction; the inner member and the outer member being mutually sintered and bonded; the inner member comprising: an inner ring portion; an outer ring portion having an outer circumference contacting with an inner circumference of the outer member; and plural radial ribs radially arranged so as to connect the ring portions; wherein the outer member has an average thickness less than that of the outer ring portion of the inner member.

The permanent magnet type rotor is also configured by sintering and bonding the outer member and the inner member and disposing plural permanent magnets on outer member. The inner member is mounted to a corresponding part such as an engine shaft. The outer member on which the permanent magnets are disposed may be a sintered compact produced by a pure ferrous powder with low carbon content and superior magnetic characteristics, and the inner member may be a sintered compact produced by a ferrous powder with high carbon content and high strength, so that a rotor having superior magnetic characteristics and high strength can be obtained. That is, the inner member is employed for strength and the outer member is employed for superior magnetic characteristics. The inner member comprises an inner ring portion, an outer ring portion, and radially arranged plural radial ribs. In this configuration, a space is formed between the radial ribs to form hollows, so that weight reduction and compact design as well as increased strength can be obtained. In the rotor of the invention, the inner member and the outer member are compacted, and the green compacts are fitted each other and sintered, so that these members are bonded and integrated. In the sintering and bonding, thermal expansion occurs in both members. When the compositions of the members, or the like, are adjusted so that the thermal expansion of the inner member is greater than that of the outer member, pressure in which the outer circumference of the inner member exerts pressure on the inner circumference of the outer member is generated. In particular, the portion of outer circumference of the outer ring portion at the radial rib is affected by large volume expansion of the radial rib, so that the pressure pushing the inner circumference of the outer member is significantly large compared to other portion. Therefore, the diffusion and bonding in the portion of outer circumference of the outer ring portion at the radial rib remarkably promotes, and the outer member and the inner member are securely bonded at the above portion. Furthermore, in the rotor of the invention, the average thickness of the outer member is less than that of the outer ring portion of the inner member. As a result, the portion of the inner member except for the ribs, which have a relatively low density, is not retracted inwardly in the radial direction by the outer member during sintering. Therefore, secure bonding is formed between the inner member and the outer member.

The present invention further provides a permanent magnet type rotor comprising: an annular outer member composed of a sintered compact; an inner member composed of a sintered compact having a lower density than that of the outer member and an outer circumference contacting with an inner circumference of the outer member; and plural permanent magnets disposed at intervals on the outer circumference of the outer member toward the circumferential direction; the inner member and the outer member being mutually sintered and bonded; the inner member comprising: an inner ring portion; an outer ring portion having an outer circumference contacting with an inner circumference of the outer member; and plural radial ribs radially arranged so as to connect the ring portions; wherein the outer member has an average thickness not less than that of the outer ring portion of the inner member, and the contacting area between the radial ribs and the outer ring portion is 10% or more of the area of the inner circumference of the outer ring portion.

In the permanent magnet type rotor, the average thickness of the outer member is not less than that of the outer ring portion of the inner member. When such a structure is employed, the portion of the inner member except for the ribs, which has a relatively low density, may usually be retracted by the outer member during sintering. In contrast, in the invention, the contacting area between the radial ribs and the outer ring portion is 10% or more of the area of the inner circumference of the outer ring portion. Therefore, in a pressure condition in which the outer circumference of the inner member exerts pressure on the inner circumference of the outer member as mentioned above, the portion of the outer circumference of the outer ring portion of the outer member at the radial rib has an area sufficient to receive the large volume expansion in the radial rib. Therefore, secure bonding can be obtained between the inner member and the outer member during sintering.

In two inner members according to the invention, a circumferential rib extending along the circumferential direction contacting with the outer ring portion may be provided between the radial ribs. According to this embodiment, the volume expansion of the inner member accommodating the bonding with the outer member is added not only by the radial rib but also by the circumferential rib. That is, the circumferential rib disposed between the radial ribs expands with heat according to its volume during sintering and bonding, so that the portion of the outer ring portion at the circumferential rib is securely pushed to the outer member and bonded thereto. Therefore, the bonding rate between the outer member and the inner member can be increased, and secured portions and portions which are not secured are arranged in the circumferential direction with a good balance.

According to preferable embodiment of the invention, the circumferential rib may have a shape in which the intermediate portion thereof between the radial ribs has the maximum volume. According to this embodiment, the volume expansion of the circumferential rib is maximum at the intermediate of the radial ribs, so that the bonding strength at that portion balances with that at the bonding portion by the radial rib, and increase of the weight for improving the bonding rate can be inhibited within the minimum range.

According to a more preferable embodiment of the invention, the radial rib may be inclined with respect to the circumferential direction of the rotor. According to this embodiment, the radial ribs stir and cause to flow the air therearound during rotation of the rotor, and the air flow cools the rotor itself. Therefore, reducing of the electrical generation performance due to temperature elevation can be inhibited.

Materials for the outer member and the inner member in the permanent magnet type rotors in which both the inner member and the outer member are made from sintered materials will be mentioned hereinafter. Compositions equivalent to class 3, class 4 or class 5 in SMF specified in JIS Z 2550 are preferable for the inner member. Compositions containing C: 0.3% by mass or less, a balance of Fe, and inevitable impurities are preferable for the outer member. The pure ferrous sintered material may further contain at least one of Si: 3.5% by mass or less, P: 0.7% by mass or less, B: 0.35 by mass or less, and Cu: 3.0% by mass or less.

In the permanent magnet type rotors, in order to ensure the bonding strength, the inner member may be fitted into the outer member along a contacting surface by passing fit with a gap of 5 ì m or less, or by tightening fit with a tightening interference of within 0.0025 times the diameter of the contacting surface before sintering.

BEST MODE FOR CARRYING OUT THE INVENTION

The permanent magnet type rotor of the invention is described in detail while referring to the accompanying drawings.

First Embodiment

Figure 1A:
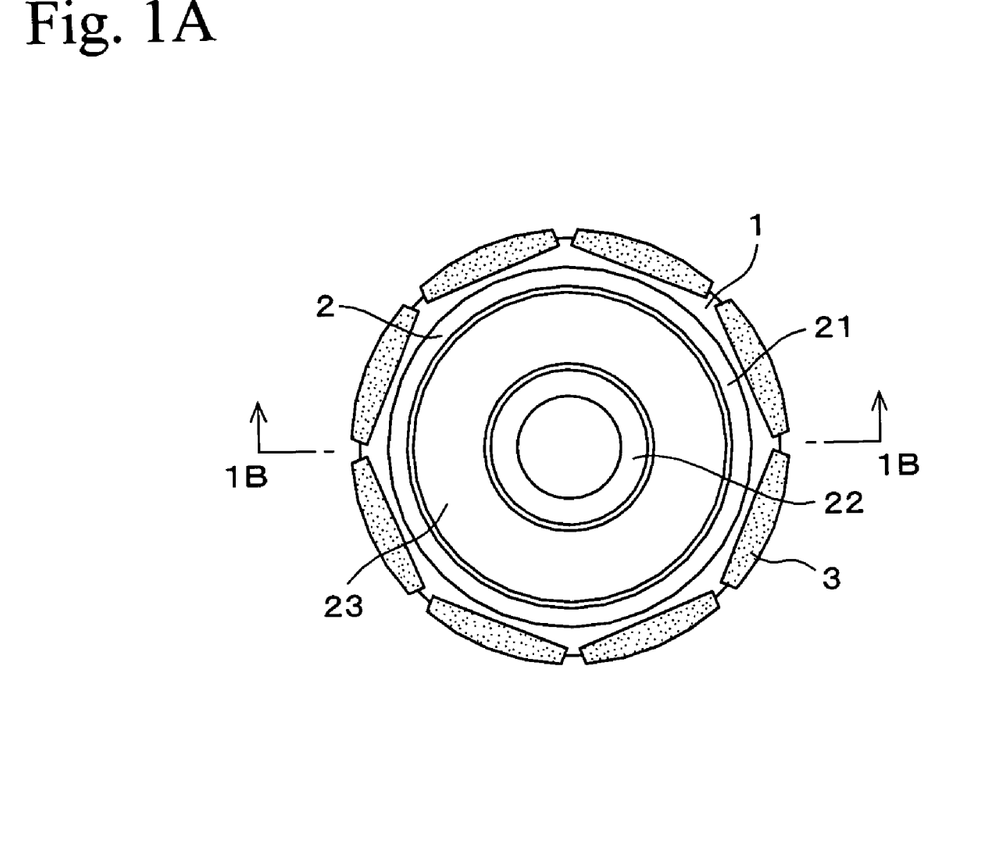
FIG. 1A is a plan view of an embodiment of a permanent magnet type rotor according to the invention.
Figure 1B:
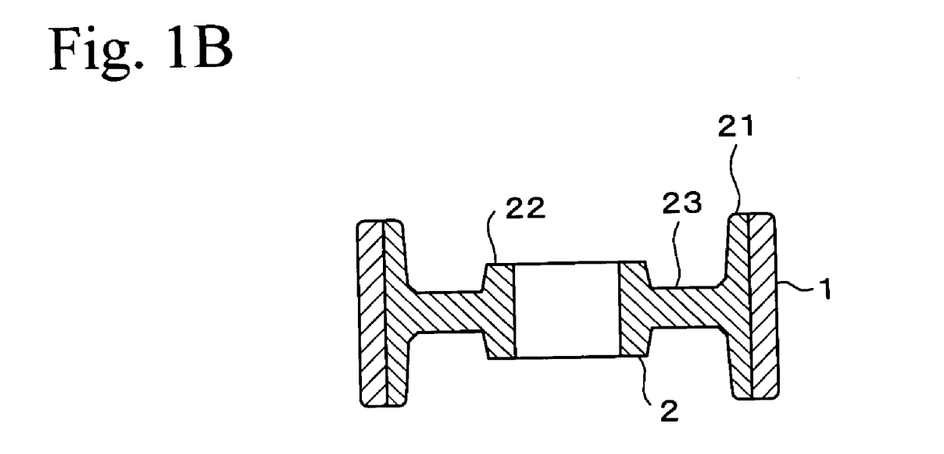
FIG. 1B is a cross sectional view taken at line 1B—1B in FIG. 1A.

FIG. 1A is a plan view of a permanent magnet type rotor in a first embodiment, and FIG. 1B is a sectional view thereof. In FIGS. 1A and 1B, reference numeral 1 is an outer member and reference numeral 2 is an inner member. The inner member 2 is composed of a ring-shaped outer ring portion 21 and an inner ring portion 22 which are connected together by means of a disk-shaped rib 23 as shown in FIG. 1. The thickness of the rib 23 is less than that of the outer ring portion 21 or the inner ring portion 22, and hence the weight is reduced. The outer member 1 is shaped like a ring, and its outer circumference is processed in a regular polygonal shape, and permanent magnets 3 are fixed thereon.

Second Embodiment

Figure 2A:
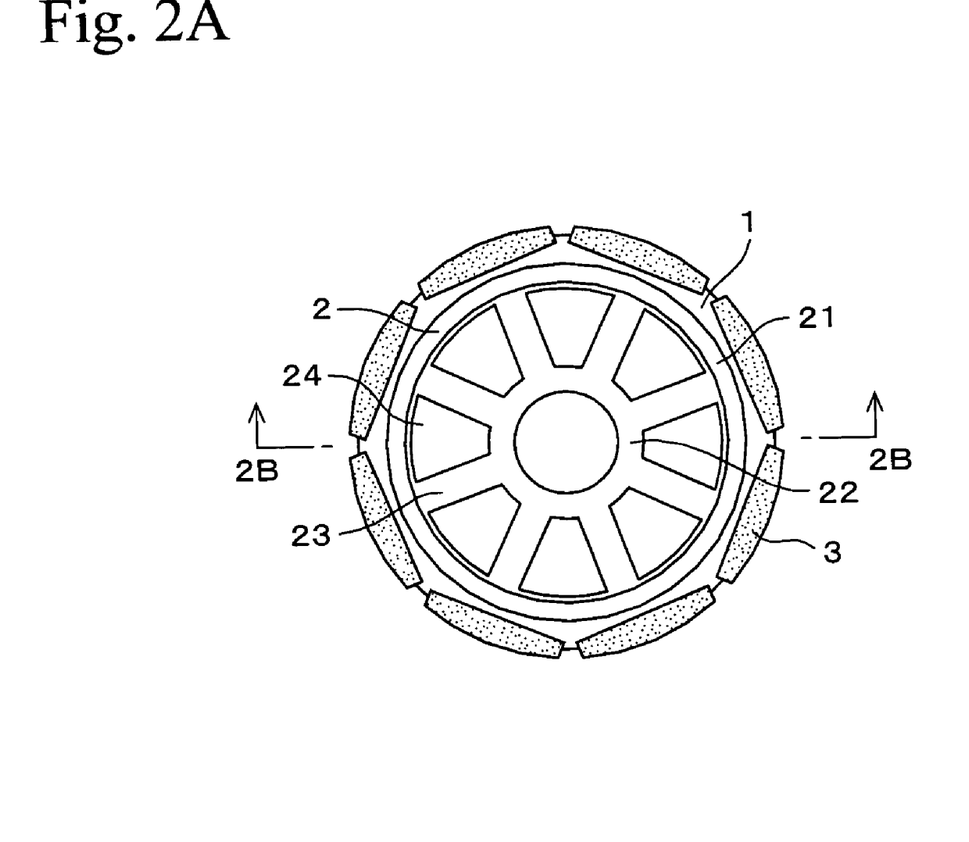
FIG. 2A is a plan view of another embodiment of a permanent magnet type rotor according to the invention.
Figure 2B:
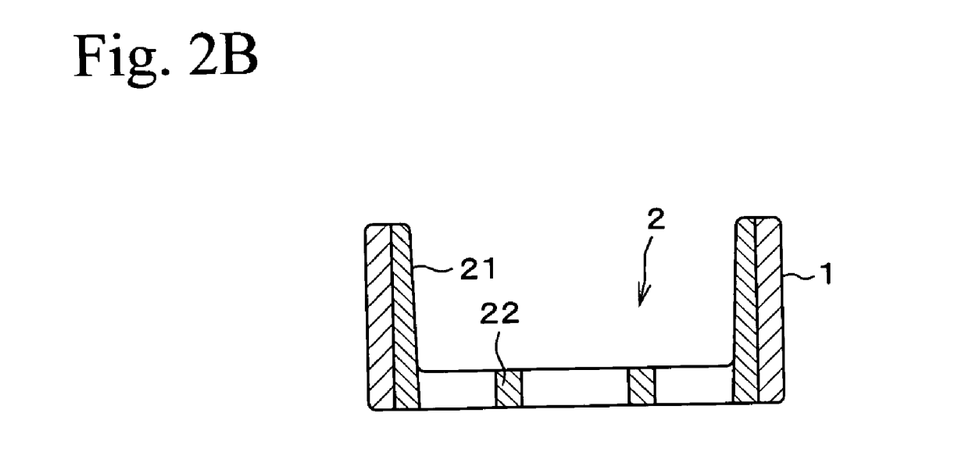
FIG. 2B is a cross sectional view taken at line 2B—2B in FIG. 2A.

FIGS. 2A and 2B show a second embodiment of the invention, in which the outer ring portion 21 and inner ring portion 22 are connected through a plurality of connecting ribs 23a disposed at equal intervals in the circumferential direction, and hollow spaces 24 are provided and the weight is further reduced.

In the permanent magnet type rotor shown in FIGS. 1A and 1B or FIGS. 2A and 2B, a ferrous alloy powder or mixed powder is compressed into a green compact having the shape of the inner member 2, and a pure ferrous powder is compressed to a green compact having an approximately annular shape. The green compact for the inner member 2, and green compact for the outer member or a sintered compact obtained by sintering it, or an outer member manufactured from an ingot steel to have an approximately annular shape are fitted together and sintered. Since the thermal expansion amount of the inner member 2 containing carbon is greater than that of the outer member 1, these members tightly contact, and sufficient diffusion bonding can be obtained and high bonding strength can be obtained. Subsequently, the outer circumference of the outer member 1 is machined to a regular polygonal shape, and permanent magnets 3 are disposed and fixed thereto, so that a weight-reduced permanent magnet type rotor having both magnetic characteristics and strength is obtained.

Figure 3:
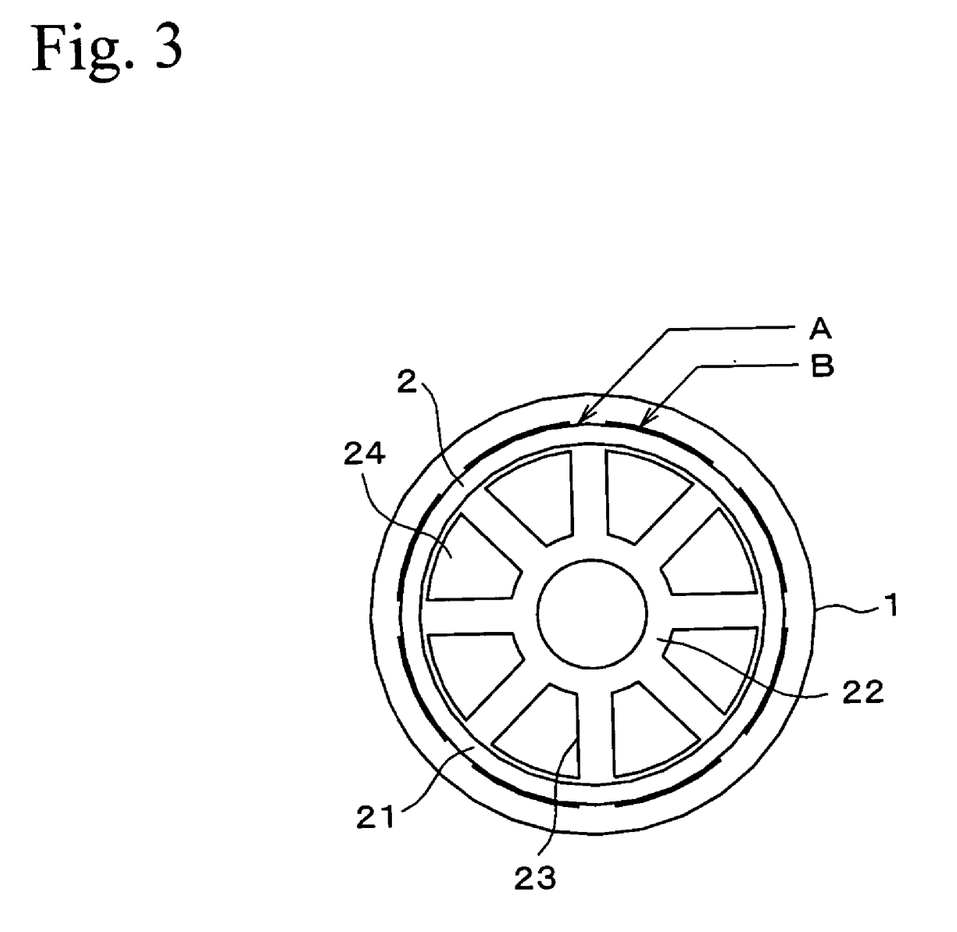
FIG. 3 is a plan view showing a bonding condition in which an inner member was fitted into an outer member and these were then sintered together.

FIG. 3 shows a condition before machining the outer member 1 of the permanent magnet type rotor shown in FIG. 2. In this permanent magnet type rotor, the thermal expansion amount of the portion of the outer ring portion 21 at the connecting rib 23a during the sintering process is greater than the portion of the outer ring portion 21 at the hollow spaces 24. Therefore, diffusion bonding is promoted most at the portion of the outer circumference of the inner member 2 and the portion of the inner circumference (part A in FIG. 3) of the outer member at the rib 23a, and the bonding strength is heightened. However, in the progress of the diffusion bonding, since carbon diffuses from the inner member 2 to the outer member 1, the magnetic characteristics of the outer member lare deteriorated.

Accordingly, in this embodiment, the permanent magnets 3 fixed on the outer circumference of the outer member 1 are disposed on the portion of the outer circumference of the outer member 1 at the connecting ribs 32a of the inner member 2 at which the magnetic characteristics are decreased, and the side of the permanent magnets 3 is positioned to be opposite to the hollow spaces 24 of the inner member 2. In the portions facing the hollow spaces 24 of the inner member 2 (part B in FIG. 3), the diffusion bonding is inhibited compared to the portions at the connecting ribs 23a (part A), so that diffusion of carbon from the inner member 2 is decreased and the magnetic characteristics can be maintained. Therefore, by disposing the side of the permanent magnets 3, in which the magnetic flux is most concentrated, at this area (part B), sufficient bonding strength can be obtained, and a permanent magnet type rotor having further superior magnetic characteristics can be obtained.

When ferrous green compacts are sintered and bonded together, as long as the two members are tightly contacted with each other at least in part of a high temperature range of about more than 800° C. in the sintering process (the required time differs according to the temperature, but may be estimated as time until the diffusion depth of the alloy components reaches about 5 ì m), sufficient bonding strength can be obtained. Sintering is usually solid phase sintering. When sintering is performed in a partly liquid phase state, the diffusion bonding is further promoted. In this case, when the generation of the liquid phase is within 5%, there is no problem in erosion or deformation. However, it is preferred that this be kept within 3% in order to maintain a sufficient size precision of the sintered compact.

Furthermore, by containing zinc in the green compact for the inner member, and without containing zinc in the green compact for the outer member or an ingot steel for the outer member, both members may be fitted together and sintered in a carburizing atmosphere. As a result, in the green compact for the inner member containing zinc, carburizing from the atmosphere occurs and contraction of its volume due to progress of sintering is suppressed, and the thermal expansion amount is greater than in the case in which zinc is not contained. Accordingly, diffusion bonding is promoted by sintering in a condition of the outer member 1 relatively tightening the inner member 1, and the two members are bonded more securely.

While the atmosphere is not carburizing in the sintering process, although the green compact for the inner member contains zinc, the effect of increase of expansion amount does not occur. When the atmosphere is carburizing, the expansion amount of the green compact is slightly increased if zinc is not contained. However, in a composite component of inner member and outer member, this phenomenon occurs similarly in both the outer member and the inner member, so that the relative difference is not apparent, and there is no effect on the bonding. When the atmosphere is carburizing and both members contain zinc, the expansion amount increases but is compensated for, and the result is the same. Zinc may be added to the green compact for the inner member, but when added in a form of zinc stearate to be used also as a forming lubricant, the labor can be saved, and it is preferred also from the viewpoint of uniform dispersion. As the atmospheric gas, a refined exothermic gas produced by natural gas or methane hydrocarbon (for example, carburizing degenerated butane gas) is preferable.

For improving of bonding strength, it is also important to define the fitting dimensional difference (the difference between the inside diameter of the hole of the outer member and the outside diameter of the inner member) when the inner member is fitted into the outer member. In this case, it is preferred to set the outside diameter of the inner member to be slightly larger (tightening fit), and press-fit the inner member into the outer member, and the tightening interference should be larger in order to achieve a higher tightness of both. However, to avoid breakage of the outer member which is low in strength before sintering (green compact) due to excessive tensile stress, the tightening interference should be preferably kept within 0.0025 times the diameter of the contacting surface. If passing fit is selected, the gap should be smaller, preferably within 5 ì m.

Third Embodiment

Figure 4A:
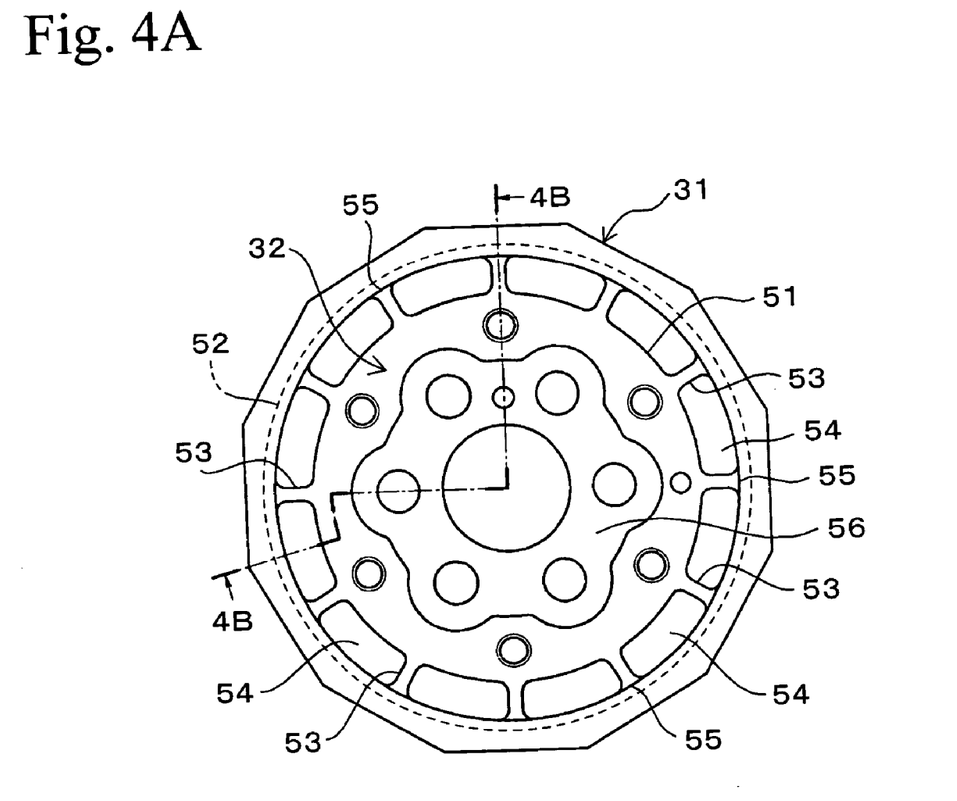
FIG. 4A is a plan view of another embodiment of a permanent magnet type rotor according to the invention.
Figure 4B:
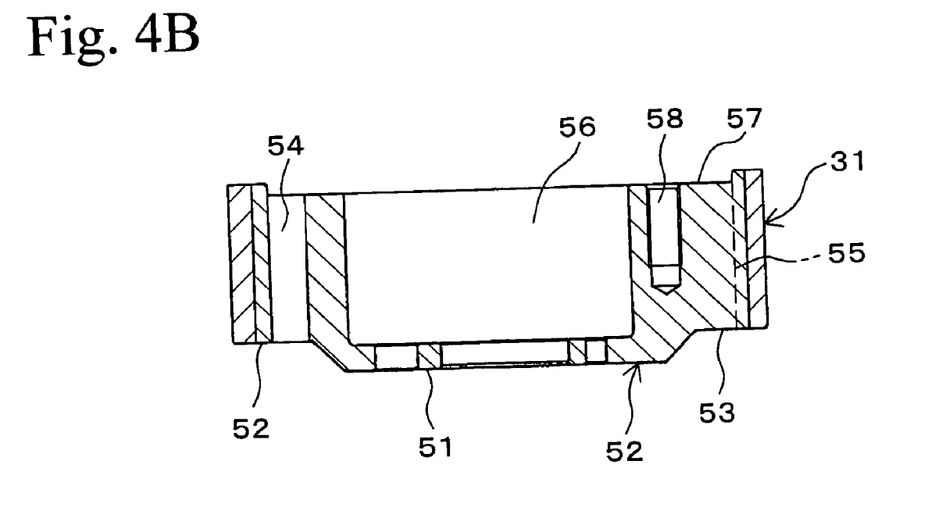
FIG. 4B is a cross sectional view taken at line 4B—4B in FIG. 4A.

FIG. 4A is a plan view of a permanent magnet type rotor in a third embodiment, and FIG. 4B is a cross sectional view taken at line 4B—4B. In FIG. 4, reference numeral 31 is an annular outer member and 32 is a cylindrical inner member. The inner member 32 is composed of an inner ring portion 51, an outer ring portion 52 of which the outer circumference contact with the inner circumference of the outer member 31, and radial ribs 53 which coaxially connect and integrate the inner ring portion 51 and the outer ring portion 52. The radial ribs 53 extend along the radial direction, and are disposed at equal intervals in the circumferential direction. A hollow portion 54 is formed between the radial ribs 53. The area rate of the bonding portion (portion indicated by numeral 55 in FIGS. 4A and 4B) of the radial rib 53 and the outer ring portion 52 with respect to the inner circumference of the outer ring portion 52 is appropriately established so as to obtain a required bonding rate (30% or more) which allows practical use for a rotor between the outer member 31 and the inner member 32 after sintering.

A recess 56 is formed at the center of the inner ring portion 51 of the inner member 32, and the circumference thereof is formed to be a thick portion 57. The radial rib 53 has approximately the same height (axial thickness) as the thick portion 57. Plural screw holes 58 are formed in the opened end surface of the recess 56 in the thick portion 57 at equal intervals along the circumferential direction. The rotor is mounted to, for example, a transmission using the screw holes 58. Plural permanent magnets (not shown) are secured on the outer circumference of the outer member 31 at equal intervals.

In the embodiment shown in FIGS. 4A and 4B, when the average thickness of the outer member 31 is equal to or greater than that of the outer ring portion 52 of the inner member 32, the proportion of the contacting area of the radial rib 53 and the outer ring portion 52 with respect to the inner circumference of the outer ring portion 52 is 10% or more. As a result, the outer ring portion 52 is provided with a sufficient area to receive the large volume expansion of the radial ribs 53, so that the inner member 32 and the outer member 31 are securely bonded each other during sintering. When the average thickness of the outer member 31 is less than that of the outer ring portion 52 of the inner member 32 (not shown), the portion of the inner member 32 except for the ribs 53, which have a relatively low density, is not retracted inwardly in the radial direction by the outer member 31 during sintering. Therefore, secure bonding is formed between the inner member 32 and the outer member 31.

Fourth Embodiment

Figure 5A:
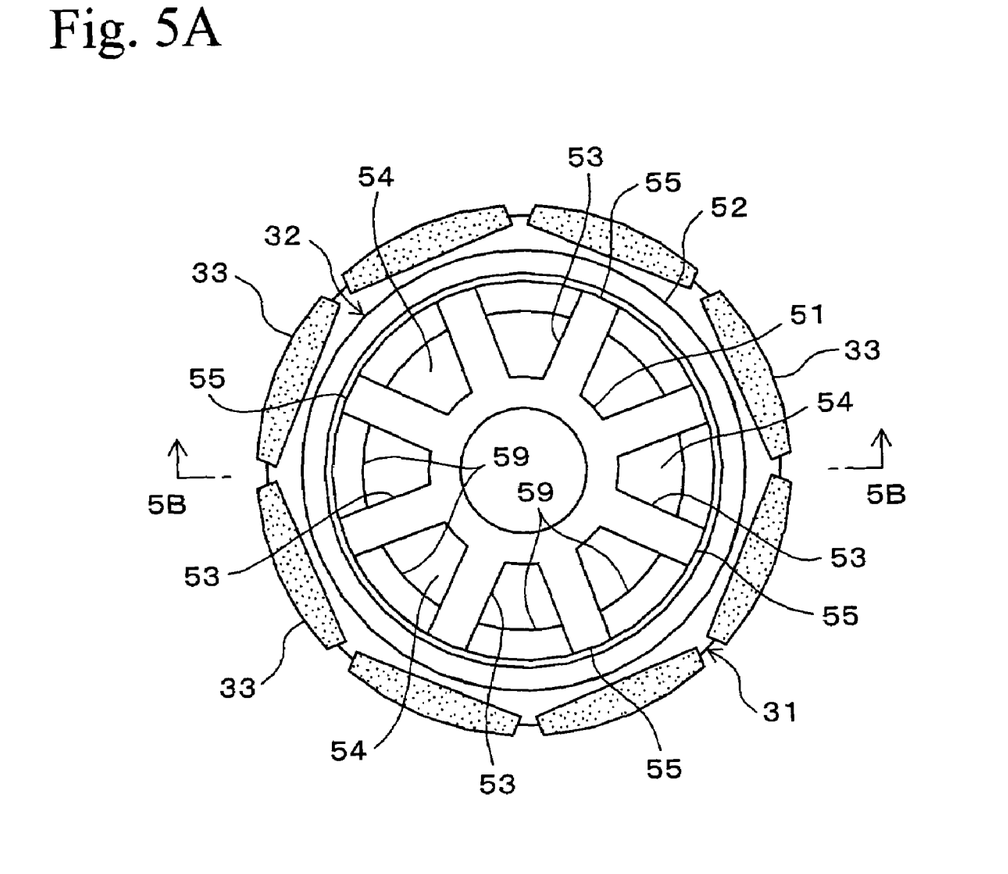
FIG. 5A is a plan view of another embodiment of a permanent magnet type rotor according to the invention.
Figure 5B:
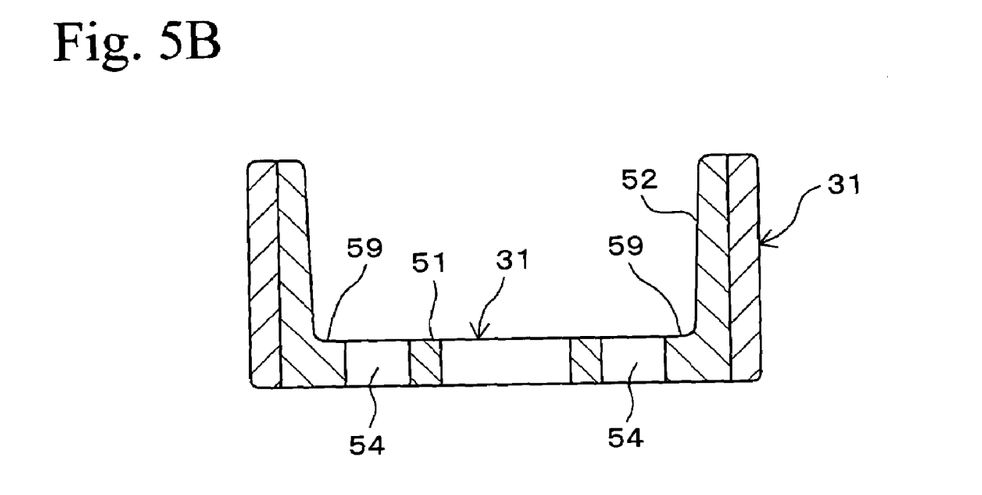
FIG. 5B is a cross sectional view taken at line 5B—5B in FIG. 5A.

FIG. 5A is a plan view of a permanent magnet type rotor in a fourth embodiment, and FIG. 5B is a cross sectional view taken at line 5B—5B. The rotor comprises an annular outer member 31 and a cylindrical inner member 32 as well as the rotor in the third embodiment. The inner member 32 is composed of an inner ring portion 51, an outer ring portion 52, and radial ribs 53. The radial ribs 53 have an approximately the same thickness as the inner ring portion 51, the height of the outer ring portion 52 (axial direction) is approximately the same as that of the outer member 31. A hollow portion 54 is formed between the radial ribs 53. In the embodiment, the area rate of the bonding portion (portion indicated by numeral 55 in FIG. 5A) of the radial rib 53 and the outer ring portion 52 with respect to the inner circumference of the outer ring portion 52 is also appropriately established so as to obtain a required bonding rate (30% or more) which allows ptactical use for a rotor between the outer member 31 and the inner member 32 after sintering. In the embodiment, a circumferential rib 59 is formed between the radial ribs 53, and is integrally formed with the outer ring portion 52 and is extended along the circumferential direction. Plural permanent magnets 33 are secured on the outer circumference of the outer member 31 at equal intervals.

The permanent magnet type rotors in the third and fourth embodiments are manufactured as follows. First, a green compact for the outer member 31 is obtained by compressing a pure ferrous powder into the shape of the outer member 31, or a sintered compact for the outer member 31 is obtained by sintering the green compact. A green compact for the inner member 32 is obtained by compressing a ferrous alloy powder or mixed powder into the shape of the inner member 32. In this case, the density of the green compact for the inner member 32 is lower than that of the green compact for the outer member 31 or the sintered compact for the outer member 31. Then, these compacts are fitted each other and sintered, and subsequently, the outer member 31 is appropriately machined and the permanent magnets 33 are arranged and secured thereon. In the sintering process, atomic dispersion occurs at the contacting surface between the outer member 31 and the inner member 32, whereby both members are bonded.

According to the above permanent magnet type rotor, the inner member 32 is a sintered compact with a low density and superior magnetic characteristics, and the inner member 32 is a sintered compact with a high carbon content and high strength, so that a rotor has superior magnetic characteristics and high strength. That is, the inner member 32 is employed for strength and the outer member 31 is employed for superior magnetic characteristics. The inner member 32 comprises the inner ring portion 51, the outer ring portion 52, and radial ribs 53 which are radially arranged and connect these portions 51 and 52. In this configuration, the hollow portion 54 is formed between the radial ribs 53, so that weight reduction and compact design as well as increased strength can be obtained.

Functions for bonding the outer member 31 and the inner member 32 in the sintering process will be explained hereinafter. In the sintering, thermal expansion occurs in both members 31 and 32. Since the inner member 32 has a lower rate of thermal expansion than that of the outer member 31, the thermal expansion of the inner member 32 is greater than that of the outer member 31, so that pressure is exerted by the outer circumference of the inner member 32 on the inner circumference of the outer member 31.

In particular, the portion of outer circumference of the outer ring portion 52 at the radial rib 53 is affected by large volume expansion of the radial rib 53, so that the pressure pushing the inner circumference of the outer member 31 is significantly large compared to other portions. Therefore, the diffusion bonding in the portion of the outer circumference of the outer ring portion 32 at the radial rib 53 is remarkably promoted, and the outer member 31 and the inner member 32 are securely bonded at the above portion. The rate of the contacting area 55 between the radial ribs 53 and the outer ring portion 52 with respect to the area of the inner circumference of the outer ring portion 52 is appropriately established, so that a required bonding rate which allows practical use for a rotor between the outer member 31 and the inner member 32 after sintering can be obtained. Therefore, both members 31 and 32 are overall securely bonded. In the embodiment, the portion in which both members are securely bonded is specified as the portion at the radial rib 53, so that the area rate can be easily established so as to securely bond both members 31 and 32.

Next, functions and advantages specified by the fourth embodiment will be explained hereinafter. In the fourth embodiment, the circumferential rib 59 extending along the circumferential direction is formed between the radial ribs 53. As a result, the volume expansion of the inner member 32 accommodating the bonding with the outer member 31 is added not only by the radial rib 53 but also by the circumferential rib 59. That is, the circumferential rib 59 expands with heat according to its volume during sintering and bonding, so that the portion of the outer ring portion 52 at the circumferential rib 59 is securely pushed to the outer member 31 and is bonded thereto. Therefore, the bonding rate between the outer member 31 and the inner member 32 can be increased and secured portions and portions which are not secured are arranged in the circumferential direction with a good balance.

In the third and fourth embodiments, the radial rib 53 may be inclined with respect to the circumferential direction of the rotor. According to this configuration, the radial ribs 53 stir and cause to flow the air therearound during rotation of the rotor, and the air flow cools the rotor itself. Therefore, reducing of the electrical generation performance due to temperature elevation can be inhibited.

In the fourth embodiment, the circumferential rib 59 preferably has a shape in which the intermediate portion thereof between the radial ribs 53 has the maximum volume. In order to have such a configuration, for example, the width (thickness in the axial direction) and/or the height (radial direction) of the circumferential rib 59 may be changed. According to the configuration, the volume expansion of the circumferential rib 59 is maximum at the intermediate of the radial ribs 53, so that the bonding strength at that portion balances with that at the bonding portion by the radial rib 53, and increase in the weight for improving the bonding rate can be inhibited within the minimum range.

Fifth Embodiment

Figure 6A:
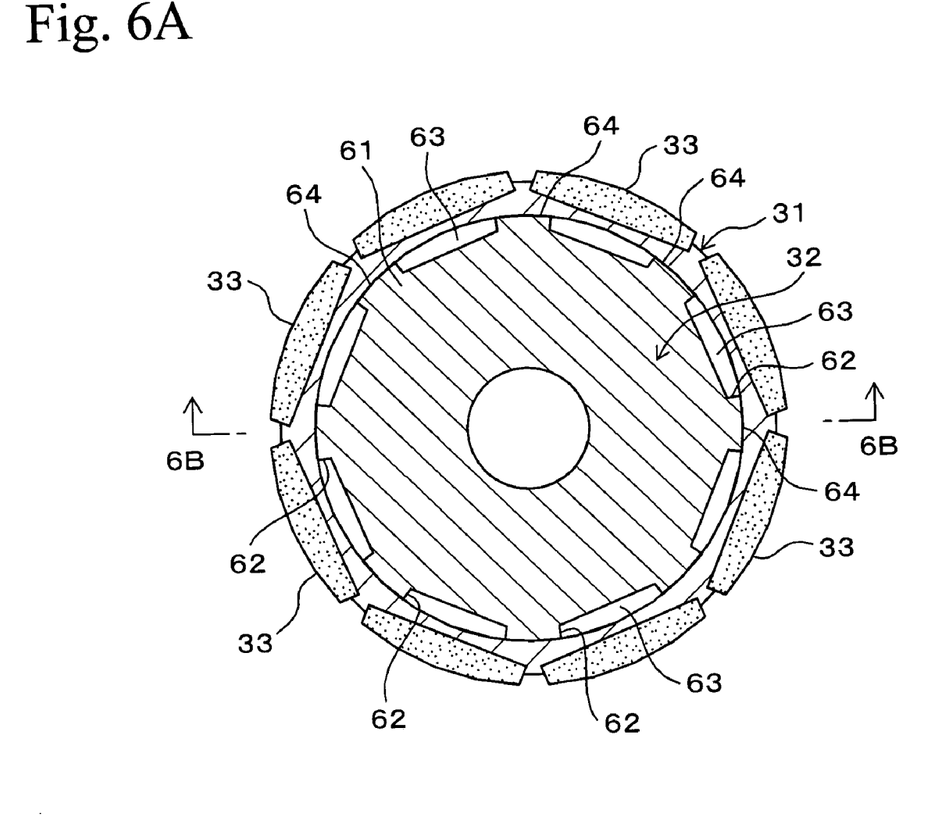
FIG. 6A is a plan view of another embodiment of a permanent magnet type rotor according to the invention.
Figure 6B:
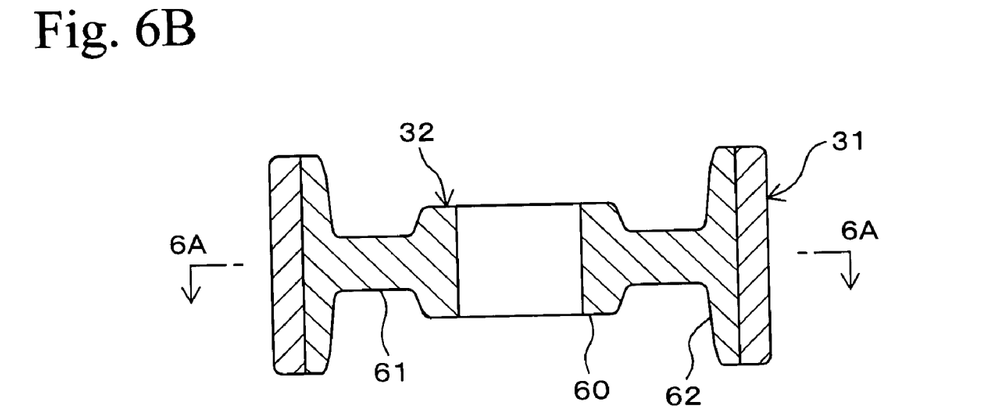
FIG. 6B is a cross sectional view taken at line 6B—6B in FIG. 6A.

FIG. 6A is a cross sectional view taken at line 6A—6A of FIG. 6B showing a permanent magnet type rotor in a fifth embodiment, and FIG. 6B is a cross sectional view taken at line 6B—6B in FIG. 6A. In FIGS. 6A and 6B, the reference numeral 31 is an annular outer member and 32 is a cylindrical inner member, and these members consist of sintered compacts. As shown in FIG. 6B, the inner member 32 is composed of a boss 60 inwardly disposed and an annular portion 61 outwardly disposed. The thickness of the annular portion 61 is less than that of the boss 60. Plural permanent magnets 33 are secured on the outer circumference of the outer member 31 at equal intervals.

As shown in FIG. 6A, plural ribs 62 which contact with the inner circumference of the outer member 31 are formed on the outer circumference of the annular portion 61 of the inner member 32 along the circumferential direction at equal intervals. A hollow portion 63 is formed between the ribs 62. The area rate of the bonding portion (portion indicated by numeral 64 in FIG. 6A) of the rib 62 and the outer member 31 with respect to the inner circumference of the outer member 31 is appropriately established so as to obtain a required bonding rate (30% or more) which allows practical use for a rotor between the outer member 31 and the inner member 32 after sintering.

In the rotor according to the fifth embodiment, the inner member 32 is a sintered compact with a density lower than that of the outer member 31, and both members are sintered and bonded each other, as well as the third and fourth embodiments. In the fifth embodiment, the bonding surface 64 on the rib 62 formed on the radially outside of the annular portion 61 of the inner member 32 is directly contacted and bonded with the inner circumference of the outer member 31. During sintering and bonding, the rib 62 expand with heat and a pressure in which the bonding surface 64 exerts pressure on the inner circumference of the outer member 31 is generated, so that both members 31 and 32 are securely bonded. By appropriately establishing the rate of the contacting area between the ribs 62 and the outer member 31 with respect to the area of the inner circumference of the outer member 31, a required bonding rate which allows ptactical use for a rotor between the outer member 31 and the inner member 32 after sintering can be obtained. Therefore, both members 31 and 32 are overall securely bonded. In the embodiment, the portion in which both members are securely bonded is specified as the bonding surface 64 of the rib 62, so that the area rate can be easily established so as to securely bond both members 31 and 32.

EXAMPLES

First Example

Figure 7:
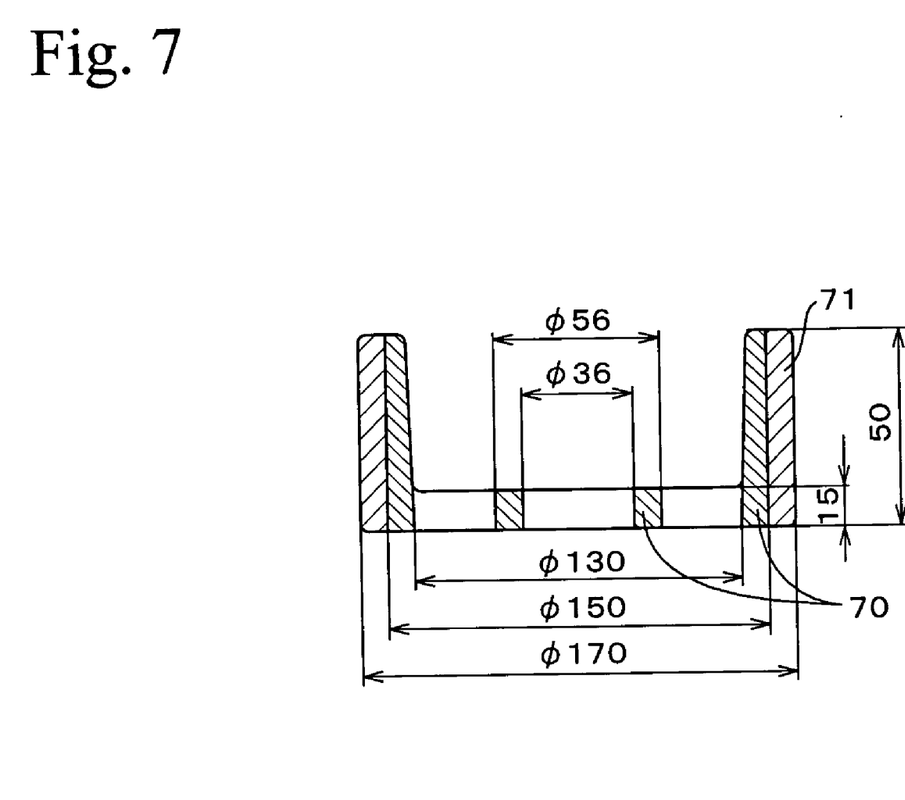
FIG. 7 is a cross section showing an outer member and an inner member manufactured in an example of the invention.

A green compact for an inner member was prepared by using an iron powder to which was added a powder containing a copper powder: 1.5% by mass, a graphite powder: 1.0% by mass, and zinc stearate as a forming lubricant, and compressing the mixed powder to a density of 6.5 g/cm$^3$ into a shape as shown in FIG. 7. In FIG. 7, the unit is millimeter. Outer member was prepared by using an iron powder to which was added zinc stearate as a forming lubricant, and compressing the mixed powder to a density of 7.0 g/cm$^3$ into in a shape as shown in FIG. 7 to obtain a green compact for an outer member 71. Another outer member was prepared by sintering the green compact for an outer member in nitrogen atmosphere at 850° C. for 30 minutes. Moreover, a pure iron ingot steel in a shape as shown in FIG. 7 was prepared as an ingot steel for an outer member.

The green compact for an inner member was tightly fitted into the green compact for an outer member, the sintered compact for an outer member, and the ingot steel for an outer member with a tightening interference of 60 i m to integrate them, and this was sintered in a degenerated butane gas at 1130° C. for 40 minutes. The bonding strength, the weight, and the magnetic flux density as magnetic characteristics in the obtained samples were measured. The results of the measurement are shown in Table 1. By way of comparison, a conventional silicon steel plate was machined into a shape as shown in FIG. 1, and a material equivalent to S45C in the JIS was cast into a shape having hollow portions by a lost wax method. The weight and the magnetic flux density were evaluated, and the results are shown in Table 1.

In following Tables 1 to 5, ⊚: good in practical use, ○: capable of practical use, Δ: limit to practical use, and X: usable.

TABLE 1

| Inner member | Composition | Fe-1.5Cu-1.0C | | | | |
|---|---|---|---|---|---|---|
| | Composition | Fe | | Fe | | S45C |
| Outer member | Condition | Green compact | Sintered compact | Ingot steel | Silicon steel | (hollow shape) |
| Bonding strength | | ○ | ○ | ○ | — | — |
| Weight | | ○ | ○ | ○ | X | ○ |
| Magnetic characteristic (B) | | ○ | ○ | ○ | ○ | X |

As is clear from Table 1, the sample from the silicon steel plate was superior in magnetic characteristic, but was heavy, and the lost wax sample from S45C material of JIS was light in weight because of the hollow shape, but was poor in magnetic characteristics. In contrast, in the sample obtained by sintering and bonding using the green compact for an inner member with the combination of the green compact for an outer member; the sintered compact for an outer member; and the ingot steel for an outer member; the weight was low, the bonding strength was high, and the magnetic characteristics were superior.

Second Example

A green compact for an inner member was prepared by using an iron powder to which was added a powder containing a copper powder: 1.5% by mass, a graphite powder: 1.0% by mass, and zinc stearate as a forming lubricant, and compressing the mixed powder to a density of 6.5 g/cm$^3$ into a shape as shown in FIG. 7. For the outer member, an iron powder (Fe powder); an Fe-20Si powder containing Si: 20% by mass, and the balance of Fe and inevitable impurities; an Fe-20P powder containing P: 20% by mass %, and the balance of Fe and inevitable impurities; an Fe-0.6P powder containing P: 0.6% by mass, and the balance of Fe and inevitable impurities; Fe-20B powder containing B: 20% by mass, and the balance of Fe and inevitable impurities; and a copper powder (Cu powder) were prepared. These powders were mixed together with zinc stearate in the blending ratios shown in Table 2, and the obtained mixed powder for forming an outer member in the composition as shown in Table 2 were compressed in the same conditions as in the first example, and thereby obtaining samples 1 to 22 of green compacts for an outer member. The green compacts for an inner member were fitted into the green compacts for an outer member in the same conditions as in the first example, and they were sintered. The bonding strength and the magnetic flux density in samples 1 to 22 were evaluated, and the results are shown in Table 2.

TABLE 2

| Sample No. | Blending ratio, mass % | | | | | | Composition of mixed powder, mass % | | | | | Bonding strength | Magnetic Characteristics B | Remarks |
|---|---|---|---|---|---|---|---|---|---|---|---|---|---|---|
| | Fe powder | Fe-20Si powder | Fe-20P powder | Fe-0.6P powder | Fe-20B powder | Cu powder | Fe | Si | P | B | Cu | | | |
| 01 | Balance | | | | | | Balance | | | | | ○ | ○ | |
| 02 | Balance | 5.0 | | | | | Balance | 1.0 | | | | ○ | ○ | |
| 03 | Balance | 15.0 | | | | | Balance | 3.0 | | | | ○ | ○ | |
| 04 | Balance | 17.5 | | | | | Balance | 3.5 | | | | ○ | Δ | |
| 05 | Balance | 20.0 | | | | | Balance | 4.0 | | | | ○ | X | Si Content out of upper limit |
| 06 | Balance | | 0.5 | | | | Balance | | 0.1 | | | ○ | ○ | |
| 07 | Balance | | 1.5 | | | | Balance | | 0.3 | | | ○ | ○ | |
| 08 | Balance | | 3.0 | | | | Balance | | 0.6 | | | ○ | ○ | |
| 09 | Balance | | 3.5 | | | | Balance | | 0.7 | | | ○ | ○ | |
| 10 | Balance | | 5.0 | | | | Balance | | 1.0 | | | ○ | X | P Content out of upper limit |
| 11 | | | | Balance | | | Balance | | 0.6 | | | ○ | ○ | |
| 12 | Balance | | | | 0.5 | | Balance | | | 0.1 | | ○ | ○ | |
| 13 | Balance | | | | 1.0 | | Balance | | | 0.2 | | ○ | ○ | |
| 14 | Balance | | | | 1.5 | | Balance | | | 0.3 | | ○ | ○ | |
| 15 | Balance | | | | 2.0 | | Balance | | | 0.4 | | Δ | X | B content out of upper limit |
| 16 | Balance | | | | | 1.0 | Balance | | | | 1.0 | ○ | ○ | |
| 17 | Balance | | | | | 2.0 | Balance | | | | 2.0 | ○ | ○ | |
| 18 | Balance | | | | | 3.0 | Balance | | | | 3.0 | Δ | Δ | |
| 19 | Balance | | | | | 5.0 | Balance | | | | 5.0 | X | X | Cu content out of upper limit |
| 20 | Balance | 1.0 | | | | 2.0 | Balance | 0.2 | | | 2.0 | ○ | ○ | |
| 21 | Balance | | 3.0 | | | 2.0 | Balance | | 0.6 | | 2.0 | ○ | ○ | |
| 22 | Balance | | | | 1.0 | 2.0 | Balance | | | 0.2 | 2.0 | ○ | ○ | |

As is clear from Table 2, in sample 4 in which the Si content was 3.5% by mass, the magnetic flux density was slightly reduced although within a practical range, and in sample 5 in which the Si content was more than 3.5% by mass, the magnetic flux density was reduced. In sample 10 in which the P content was more than 0.7% by mass, impurities precipitated at grain boundaries, and the magnetic flux density was reduced. In sample 15 in which the B content was more than 0.3% by mass, impurities precipitated at grain boundaries, and the magnetic flux density was reduced, and also the bonding strength was slightly reduced.

In sample 18 in which the Cu content was 3% by mass, reduction of the magnetic characteristics and slight reduction of the bonding strength were observed due to a Cu expansion phenomenon, and in sample 19 exceeding 3% by mass, due to excessive expansion of Cu, the gap between the outer member and the inner member increased, and the bonding strength was decreased, and also the magnetic characteristics were reduced. Thus, as long as the Si content, the P content, the B content, and the Cu content were within a preferred range of the invention, both bonding strength and magnetic characteristics were superior, but if any element was out of the preferred range of the invention, it was demonstrated that the magnetic characteristics were deteriorated.

Third Example

Green compacts for an inner member and green compacts for an outer member were prepared in the same conditions as in the first example, and were fitted and integrated with in the fitting differences or interferences as shown in Table 3. Then, these were sintered in the same conditions as in the first example, and the bonding strength and the magnetic characteristics were evaluated, and the results are shown in Table 3.

TABLE 3

| Inner member Outer member | Composition Composition | Fe-1.5Cu-1.0C Fe | | | | |
|---|---|---|---|---|---|---|
| Fitting difference (Interference) | | +10 µm Passing fit | +5 µm | −60 µm Tightening fit | −375 µm | −400 µm Broken |
| Bonding strength | | Δ | ○ | ○ | ○ | — |
| Magnetic characteristics (B) | | ○ | ○ | ○ | ○ | — |

As is clear from Table 3, in the passing fit with a fitting difference 5 ì m, a favorable bonding strength was obtained, but in the passing fit with a gap of 10 ì m, sufficient bonding was not obtained and the bonding strength was reduced. In this test, when the diameter of the contacting surface was 150 mm, a favorable bonding strength was obtained by tightening fit with the tightening interference of 0.0025 times the diameter of the contacting surface (0.375 mm=375 ì m), but the green compact was broken by tightening fit with the larger tightening interference 400 ì m.

Fourth Example

Green compacts for an inner member were prepared by using a mixed powder containing an iron powder, a copper powder: 1.5% by mass, a graphite powder: 1.0% by mass, and adding zinc stearate (Zn-St) as a a forming lubricant to the mixed powder, alternatively adding lithium stearate (Li-St) as a forming lubricant to the mixed powder, and compressing the mixed powders in the same conditions as in the first example. For outer members, a mixed powder containing an iron powder and zinc stearate as a forming lubricant, and a mixed powder containing an iron powder and lithium stearate were prepared. These mixed powders were compressed in the same conditions as in the first example to obtain green compacts for an outer member. These compacts for inner members and outer members were combined, and were fitted by tightening fit with the tightening interference of 60 ì m. Then, they were held in a decomposed ammonia gas atmosphere and a degenerated butane gas atmosphere at 1130° C. for 40 minutes. The bonding strength and the magnetic characteristics in the samples were evaluated, and the results are shown in Table 4.

TABLE 4

| | Composition | Fe-1.5cu-1.0C | | | |
|---|---|---|---|---|---|
| Inner member | Forming lubricant | Zn-St | Zn-St | Li-St | Zn-St |
| | Composition | Fe | | | |
| Outer member | Forming lubricant | Zn-St | Li-St | Li-St | Zn-St |
| Sintering atmosphere | | Decomposed ammonia gas | Degenerated butane gas | Degenerated butane gas | Degenerated butane gas |
| Bonding strength | | ○ | ⊙ | ○ | ○ |
| Magnetic characteristics (B) | | ⊙ | ○ | ○ | ○ |

As is clear from Table 4, favorable bonding strength and magnetic characteristic were observed in the combination of the green compact for an inner member using zinc stearate as a forming lubricant and the green compact for an outer member using zinc stearate as a forming lubricant and being sintered in a decomposed ammonia gas atmosphere; in the combination of the green compact for an inner member using zinc stearate as a forming lubricant and the green compact for an outer member using lithium stearate as a forming lubricant being sintered in a degenerated butane gas atmosphere; in the combination of the green compact for an inner member using lithium stearate as a forming lubricant and the green compact for an outer member using lithium stearate as a forming lubricant and being sintered in a degenerated butane gas atmosphere; and in the combination of the green compact for an inner member using zinc stearate as a forming lubricant and the green compact for an outer member using zinc stearate as a forming lubricant and being sintered in a degenerated butane gas atmosphere; the bonding strength and the magnetic characteristics were good. In particular, it was confirmed that the bonding strength is extremely high when the sintering was performed in a degenerated butane gas by using the green compact for an outer member using lithium stearate.

Fifth Example

Rotors shown in FIG. 5 in which the rate of the contacting area between the radial ribs and the outer ring portion with respect to the area of the inner circumferential of the outer ring portion was varied by setting the number of the radial ribs to 12 and the outer diameter of the outer member to 155 mm, and varying the average thickness of the outer member, the average thickness of the outer ring portion of the inner member, and the thickness of the radial ribs. Green compacts for inner members were prepared by using a mixed powder with a composition equivalent to class 3 in SMF and zinc stearate as a forming lubricant, and compressing the mixed powder to a density of 6.5 g/cm³. Green compacts for outer members were prepared by using a mixed powder with an iron powder and zinc stearate as a forming lubricant, and compressing the mixed powder to a density of 7.0 g/cm³. The compact for an inner member was fitted into the compact for an outer member with a tightening interference of 60 ì m to integrated thereof, and they were sintered in a degenerated butane gas atmosphere at 1130° C. for 40 minutes.

Figure 8:
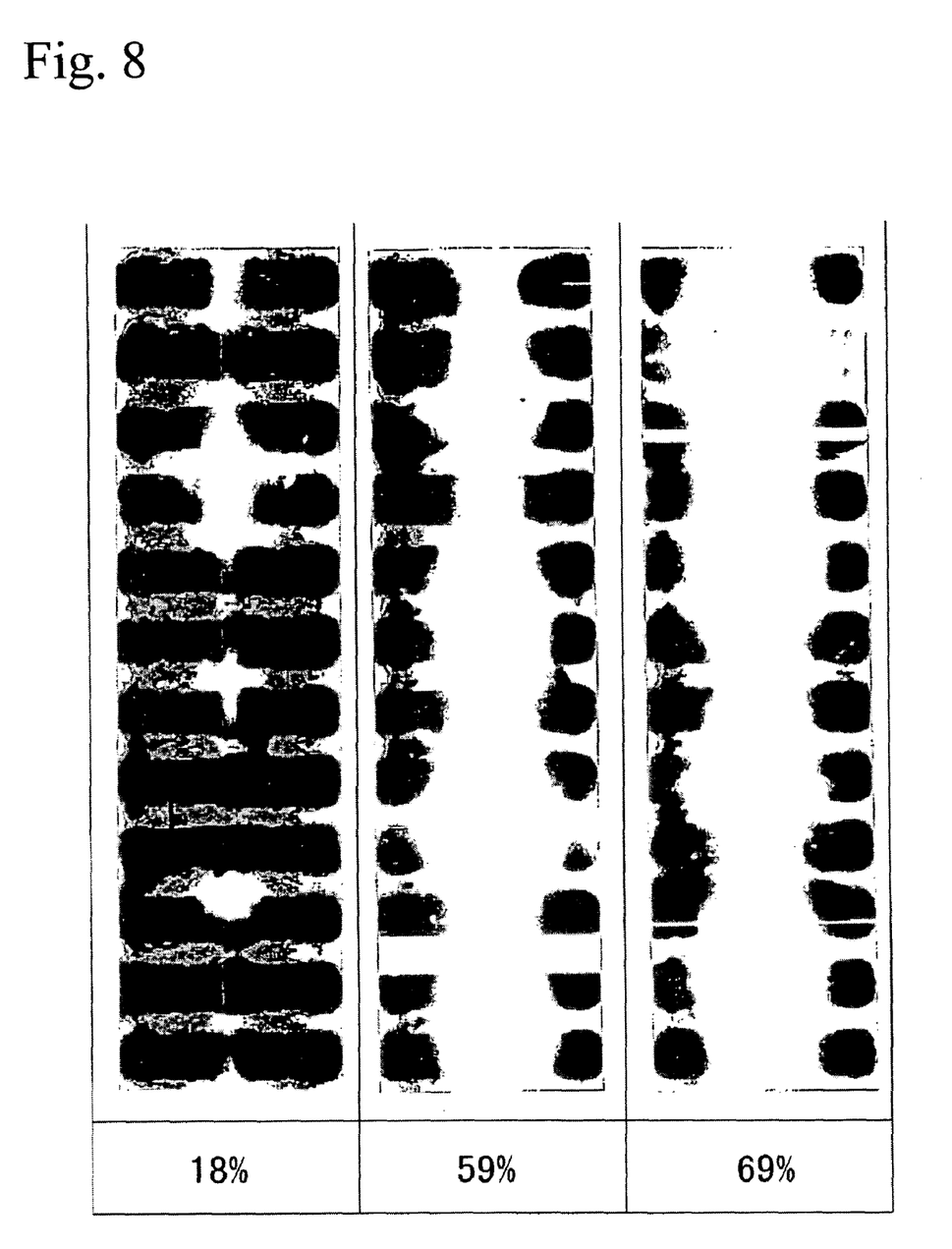
FIG. 8 is a photograph showing the distribution of bonding strength in a rotor manufactured in an example of the invention.

The condition of the contacting surface between the outer member and the inner member in the rotor was observed by an ultrasonic crack detector (M-500, produced by CANON Corporation) to obtain the bonding rate. The results are shown in Table 5. The bonding rate was obtained in the following manner. FIG. 8 shows data of the bonding strength distribution in which the bonding condition along the circumferential direction was output by the ultrasonic crack detector. In the data, the white portion is a securely bonded portion in which the diffusion and the bonding were sufficiently progressed and there is no boundary surface between the outer member and the inner member. In contrast, the colored portion is a loosely bonded portion in which a boundary surface exists between the outer member and the inner member. The bonding rate was obtained by measuring the area of the white portion based on the data of the bonding strength distribution.

According to Table 5, when the average thickness of the outer member was less than that of the outer ring portion of the inner member, overall high bonding rate was obtained. In the case in which the average thickness of the outer member was not less than that of the outer ring portion of the inner member, in sample 42 having a contacting area of 6% between the radial ribs and outer ring portion with respect to the area of the inner circumference of the outer ring portion, as shown in FIG. 8 (left portion), the bonding rate was scarce with 18%, and the bonding strength was insufficient. However, in other samples, when the contacting areas between the radial ribs and outer ring portion with respect to the area of the inner circumference of the outer ring portion were 10% or more, the bonding rates were 30% or more, and the bonding strength were sufficient. FIG. 8 (right and center portions) shows data of the bonding strength distribution output by the ultrasonic crack detector for samples 35 and 45 as typical samples. As is clear from the figure, in the data, the proportion of the white portion (bonding area) is large, and this demonstrates high bonding strength.

The above example demonstrates that sufficient bonding strength can be obtained when the bonding rate is 30% or more, and that the contacting area between the radial ribs and the outer ring portion with respect to the area of the inner circumference must be 10% or more to obtain the above advantages.

The invention claimed is:

1. A permanent magnet type rotor comprising:
    an inner member having an outer ring portion;
    an approximately annular outer member having soft magnetism and an inner circumference contacting an outer circumference of the outer ring portion; and
    a plurality of permanent magnets disposed at equal intervals along an outer circumference of the outer member toward the circumferential direction;
    wherein at least one of the inner member and the outer member is made from a sintered material,
    wherein the inner member and the outer member are mutually diffusion-bonded together by sintering, and

TABLE 5

| Sample No. | Outer diameter of outer member (mm) | Average thickness of outer member (mm) | Average thickness of outer ring portion of inner member (mm) | Width of rib (mm) | Rate of bonding area between radial ribs and outer ring portion with respect to inner circumference of outer ring portion (%) | Bonding rate (%) | Bonding strength | Note |
|---|---|---|---|---|---|---|---|---|
| 31 | 155 | 7.0 | 10.5 | 4.0 | 25.5 | 70 | ⊙ | Average thickness |
| 32 | 155 | 7.0 | 9.5 | 4.0 | 25.0 | 72 | ⊙ | of outer member |
| 33 | 155 | 7.0 | 8.5 | 4.0 | 24.6 | 73 | ⊙ | is less than |
| 34 | 155 | 7.0 | 7.5 | 1.0 | 6.1 | 66 | ⊙ | average thickness |
| 35 | 155 | 7.0 | 7.5 | 1.6 | 9.7 | 69 | ⊙ | of outer ring portion |
| 36 | 155 | 7.0 | 7.5 | 3.0 | 18.2 | 71 | ⊙ | of inner member |
| 37 | 155 | 7.0 | 7.5 | 5.0 | 30.3 | 82 | ⊙ | |
| 38 | 155 | 7.0 | 7.5 | 7.0 | 42.4 | 88 | ⊙ | |
| 39 | 155 | 7.0 | 6.5 | 4.0 | 23.9 | 75 | ⊙ | Average thickness |
| 40 | 155 | 7.0 | 5.5 | 4.0 | 23.5 | 68 | ⊙ | of outer member |
| 41 | 155 | 7.0 | 5.0 | 4.0 | 23.3 | 64 | ⊙ | is not less than |
| 42 | 155 | 7.0 | 4.5 | 1.0 | 5.8 | 18 | X | average thickness |
| 43 | 155 | 7.0 | 4.5 | 1.7 | 9.8 | 30 | ○ | of outer ring portion |
| 44 | 155 | 7.0 | 4.5 | 3.0 | 17.4 | 43 | ○ | of inner member |
| 45 | 155 | 7.0 | 4.5 | 4.0 | 23.3 | 59 | ⊙ | |
| 46 | 155 | 7.0 | 4.5 | 5.0 | 28.9 | 70 | ⊙ | |
| 47 | 155 | 7.0 | 4.5 | 7.0 | 40.5 | 80 | ⊙ | |
| 48 | 155 | 7.0 | 4.0 | 4.0 | 23.0 | 48 | ⊙ | |
| 49 | 155 | 7.0 | 3.5 | 4.0 | 22.8 | 39 | ○ | |
| 50 | 155 | 7.0 | 3.0 | 4.0 | 22.6 | 30 | ○ | | wherein the inner member comprises an inner ring portion having one of a shaft or a through hole for a shaft, and is composed by connecting the outer ring portion and the inner ring portion by at least one rib.

2. The permanent magnet type rotor according to claim 1, wherein the at least one rib includes a plurality of connecting ribs disposed at equal intervals in a circumferential direction, and the plurality of permanent magnets are disposed on the outer circumference of the outer member at the connecting ribs of the inner member respectively.

3. The permanent magnet type rotor according to claim 1, wherein the outer member is composed of an ingot steel having a magnetic characteristic of saturated magnetic flux density of 1.0 T or more.

4. The permanent magnet type rotor according to claim 1, wherein the inner member is formed from any one of an ingot steel, a green compact, or a ferrous sintered material containing carbon.

5. A permanent magnet type rotor comprising:
an inner member having an outer ring portion;
an approximately annular outer member having soft magnetism and an inner circumference contacting an outer circumference of the outer ring portion; and
a plurality of permanent magnets disposed at equal intervals along an outer circumference of the outer member toward the circumferential direction;
wherein at least one of the inner member and the outer member is made from a sintered material,
wherein the inner member and the outer member are mutually diffusion-bonded together by sintering,
wherein the outer member is composed of a ferrous sintered material containing C: 0.3% by mass or less, a balance of Fe, and inevitable impurities, and
wherein the ferrous sintered material further contains at least one of Si: 3.5% by mass or less, P: 0.7% by mass or less, B: 0.35 by mass or less, and Cu: 3.0% by mass or less.

6. A permanent magnet type rotor comprising:
an annular outer member composed of a sintered compact;
an inner member composed of a sintered compact having a lower density than that of the outer member and an outer circumference contacting with an inner circumference of the outer member; and
plural permanent magnets disposed at intervals on the outer circumference of the outer member toward the circumferential direction;
the inner member and the outer member being mutually sintered and bonded;
the inner member comprising:
an inner ring portion; an outer ring portion having an outer circumference contacting with an inner circumference of the outer member; and
plural radial ribs radially arranged so as to connect the ring portions;
wherein the outer member has an average thickness less than that of the outer ring portion of the inner member.

7. A permanent magnet type rotor comprising:
an annular outer member composed of a sintered compact;
an inner member composed of a sintered compact having a lower density than that of the outer member and an outer circumference contacting with an inner circumference of the outer member; and
plural permanent magnets disposed at intervals on the outer circumference of the outer member toward the circumferential direction;
the inner member and the outer member being mutually sintered and bonded;
the inner member comprising:
an inner ring portion;
an outer ring portion having an outer circumference contacting with an inner circumference of the outer member; and
plural radial ribs radially arranged so as to connect the ring portions;
wherein the outer member has an average thickness not less than that of the outer ring portion of the inner member, and
the contacting area between the radial ribs and the outer ring portion is 10% or more of the area of the inner circumference of the outer ring portion.

8. The permanent magnet type rotor according to claim 6, wherein a circumferential rib extending along the circumferential direction contacting with the outer ring portion is provided between the radial ribs.

9. The permanent magnet type rotor according to claim 8, wherein the circumferential rib has a shape in which the intermediate portion thereof between the radial ribs has the maximum volume.

10. The permanent magnet type rotor according to claim 8, wherein the radial rib is inclined with respect to the circumferential direction of the rotor.

* * * * *